United States Patent [19]

Koller

[11] Patent Number: 4,937,747

[45] Date of Patent: Jun. 26, 1990

[54] ITERATIVE DISJOINT CLUSTER AND DISCRIMINANT FUNCTION PROCESSING OF FORMATION LOG RESPONSES AND OTHER DATA

[75] Inventor: Glenn R. Koller, Tulsa, Okla.

[73] Assignee: Amoco Corporation, Chicago, Ill.

[21] Appl. No.: 157,549

[22] Filed: Feb. 16, 1988

[51] Int. Cl.$^5$ .............................................. G01V 11/00
[52] U.S. Cl. ..................................... 364/422; 324/323
[58] Field of Search ...................... 364/420, 422; 382/9

[56] References Cited

U.S. PATENT DOCUMENTS

| | | | |
|---|---|---|---|
| 4,646,240 | 2/1987 | Serra et al. | 364/422 |
| 4,648,268 | 3/1987 | Grosjean | 73/152 |

FOREIGN PATENT DOCUMENTS 2117146A 10/1983 United Kingdom .

OTHER PUBLICATIONS

Gill, "Application of a Statistical Method to Reservoir Evaluation and Digitized Log Analysis", AAPG Bulletin, vol. 54, No. 5, (1970), pp. 719-729.
Hempkins, "Discriminant and Cluster Analysis as Statistical Aids in Stratigraphic Correlation", AAPG Bulletin, vol. 66, No. 5, (1982), p. 581.
Busch, "Determination of Lithology From Well Logs by Statistical Analysis", SPE, 14301, presented Sep. 22-25, 1985.
Baldwin and Morrow, "Identifying Subsurface facies from User-Directed Computer Processing of Log and Other Data," Association Round Table, p. 462.
Anderbert, Cluster Analysis for Applications, Chapter 7, "Nonhierarchical Clustering Methods," (1973).
Davis, Statistics and Data Analysis in Geology, pp. 442-456, "Discriminant Functions".
SAS ® USERS GUIDE: Statistics, Version V Edition, Chapter 16, "The DISCRIM Procedure," and Chapter 18, The FASTCLUS Procedure, (1985).

Primary Examiner—Charles E. Atkinson
Assistant Examiner—David Huntley
Attorney, Agent, or Firm—Gary M. Bond; Fred E. Hook

[57] ABSTRACT

A set of representative subpopulations of a dataset such as a set of depth related formation log responses is selected by (a) classifying the dataset into n=a disjoint clusters; (b) determining discriminant function for the thus produced n=a disjoint clusters; (c) generating a measure respresentative of agreement/disagreement betweeen the classification generated by cluster analysis in step (a) and the classification generated by discriminant analysis in step (b); (d) repeating steps a-c for other numbers n=a, b, c, . . . ; and (e) selecting the set n=k where k is a, b, c, . . . , where the measure shows best agreement.

21 Claims, 13 Drawing Sheets

Discriminant Function Classification
of Two Disjoint Clusters
Resulting in Two Misclassifications

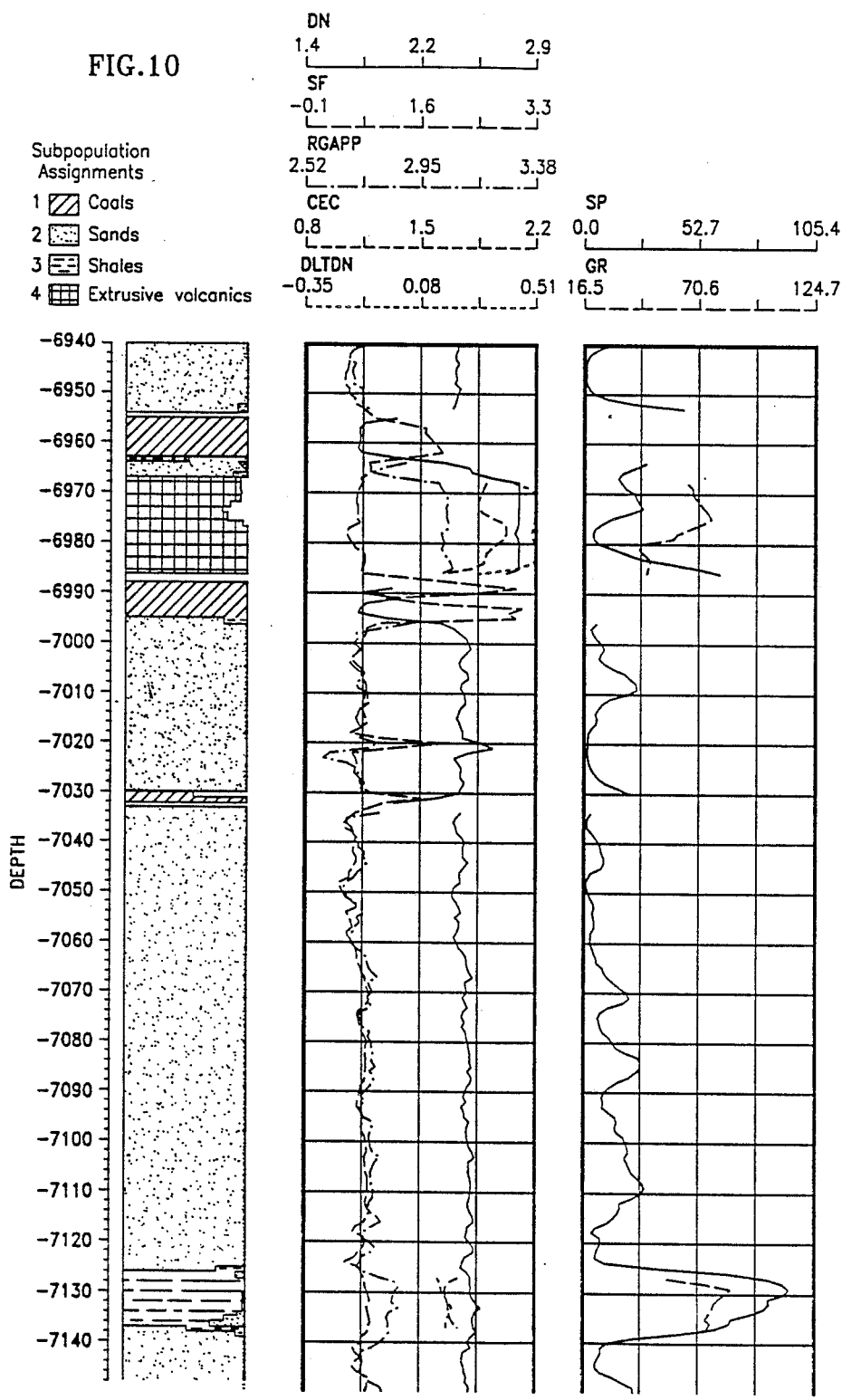

| Depth | Log 1 | Log 2 | Log 3 | Log 4 | Log 5 | Log 6 | . . . . |
|---|---|---|---|---|---|---|---|
| $d_1$ | $L_{11}$ | $L_{12}$ | $L_{13}$ | $L_{14}$ | $L_{15}$ | $L_{16}$ | . . . . |
| $d_2$ | $L_{21}$ | $L_{22}$ | $L_{23}$ | $L_{24}$ | $L_{25}$ | $L_{26}$ | . . . . |
| $d_3$ | $L_{31}$ | $L_{32}$ | $L_{33}$ | $L_{34}$ | $L_{35}$ | $L_{36}$ | . . . . |
| $d_4$ | $L_{41}$ | $L_{42}$ | $L_{43}$ | $L_{44}$ | $L_{45}$ | $L_{46}$ | . . . . |
| $d_5$ | $L_{51}$ | $L_{52}$ | $L_{53}$ | $L_{54}$ | $L_{55}$ | $L_{56}$ | . . . . |
| $d_6$ | $L_{61}$ | $L_{62}$ | $L_{63}$ | $L_{64}$ | $L_{65}$ | $L_{66}$ | . . . . |
| . | . | . | . | . | . | . | |
| . | . | . | . | . | . | . | |
| . | . | . | . | . | . | . | |
| . | . | . | . | . | . | . | |

FIG. 11A

| Depth | Log 1 | Log 2 | Log 3 | Log 4 | Log 5 | Log 6 | . . . . |
|---|---|---|---|---|---|---|---|
| $d_1$ | $L_{11}$ | $L_{12}$ | $L_{13}$ | $L_{14}$ | $L_{15}$ | $L_{16}$ | . . . . |
| $d_2$ | $L_{21}$ | $L_{22}$ | $L_{23}$ | $L_{24}$ | $L_{25}$ | $L_{26}$ | . . . . |
| $d_3$ | $L_{31}$ | $L_{32}$ | $L_{33}$ | $L_{34}$ | $L_{35}$ | $L_{36}$ | . . . . |
| $d_4$ | $L_{41}$ | $L_{42}$ | $L_{43}$ | $L_{44}$ | $L_{45}$ | $L_{46}$ | . . . . |
| $d_5$ | $L_{51}$ | $L_{52}$ | $L_{53}$ | $L_{54}$ | $L_{55}$ | $L_{56}$ | . . . . |
| $d_6$ | $L_{61}$ | $L_{62}$ | $L_{63}$ | $L_{64}$ | $L_{65}$ | $L_{66}$ | . . . . |
| . | . | . | . | . | . | . | |
| . | . | . | . | . | . | . | |
| . | . | . | . | . | . | . | |
| . | . | . | . | . | . | . | |

FIG. 11B

| Depth | Log 1 | Log 2 | Log 3 | Log 4 | Log 5 | Log 6 | .... |
|---|---|---|---|---|---|---|---|
| $d_1$ | $L_{11}$ | $L_{12}$ | $L_{13}$ | $L_{14}$ | $L_{15}$ | $L_{16}$ | .... |
| $d_2$ | $L_{21}$ | $L_{22}$ | $L_{23}$ | $L_{24}$ | $L_{25}$ | $L_{26}$ | .... |
| $d_3$ | $L_{31}$ | $L_{32}$ | $L_{33}$ | $L_{34}$ | $L_{35}$ | $L_{36}$ | .... |
| $d_4$ | $L_{41}$ | $L_{42}$ | $L_{43}$ | $L_{44}$ | $L_{45}$ | $L_{46}$ | .... |
| $d_5$ | $L_{51}$ | $L_{52}$ | $L_{53}$ | $L_{54}$ | $L_{55}$ | $L_{56}$ | .... |
| $d_6$ | $L_{61}$ | $L_{62}$ | $L_{63}$ | $L_{64}$ | $L_{65}$ | $L_{66}$ | .... |

FIG. 11C

| Depth | Log 1 | Log 2 | Log 3 | Log 4 | Log 5 | Log 6 | .... |
|---|---|---|---|---|---|---|---|
| $d_1$ | $L_{11}$ | $L_{12}$ | $L_{13}$ | $L_{14}$ | $L_{15}$ | $L_{16}$ | .... |
| $d_2$ | $L_{21}$ | $L_{22}$ | $L_{23}$ | $L_{24}$ | $L_{25}$ | $L_{26}$ | .... |
| $d_3$ | $L_{31}$ | $L_{32}$ | $L_{33}$ | $L_{34}$ | $L_{35}$ | $L_{36}$ | .... |
| $d_4$ | $L_{41}$ | $L_{42}$ | $L_{43}$ | $L_{44}$ | $L_{45}$ | $L_{46}$ | .... |
| $d_5$ | $L_{51}$ | $L_{52}$ | $L_{53}$ | $L_{54}$ | $L_{55}$ | $L_{56}$ | .... |
| $d_6$ | $L_{61}$ | $L_{62}$ | $L_{63}$ | $L_{64}$ | $L_{65}$ | $L_{66}$ | .... |

FIG. 11D

| Depth | Log 1 | Log 2 | Log 3 | Log 4 | Log 5 | Log 6 .... |
|---|---|---|---|---|---|---|
| $d_1$ | $L_{11}$ | $L_{12}$ | $L_{13}$ | $L_{14}$ | $L_{15}$ | $L_{16}$ .... |
| $d_2$ | $L_{21}$ | $L_{22}$ | $L_{23}$ | $L_{24}$ | $L_{25}$ | $L_{26}$ .... |
| $d_3$ | $L_{31}$ | $L_{32}$ | $L_{33}$ | $L_{34}$ | $L_{35}$ | $L_{36}$ .... |
| $d_4$ | $L_{41}$ | $L_{42}$ | $L_{43}$ | $L_{44}$ | $L_{45}$ | $L_{46}$ .... |
| $d_5$ | $L_{51}$ | $L_{52}$ | $L_{53}$ | $L_{54}$ | $L_{55}$ | $L_{56}$ .... |
| $d_6$ | $L_{61}$ | $L_{62}$ | $L_{63}$ | $L_{64}$ | $L_{65}$ | $L_{66}$ .... |

FIG. 11E

| Depth | Log 1 | Log 2 | Log 3 | Log 4 | Log 5 | Log 6 .... |
|---|---|---|---|---|---|---|
| $d_1$ | $L_{11}$ | $L_{12}$ | $L_{13}$ | $L_{14}$ | $L_{15}$ | $L_{16}$ .... |
| $d_2$ | $L_{21}$ | $L_{22}$ | $L_{23}$ | $L_{24}$ | $L_{25}$ | $L_{26}$ .... |
| $d_3$ | $L_{31}$ | $L_{32}$ | $L_{33}$ | $L_{34}$ | $L_{35}$ | $L_{36}$ .... |
| $d_4$ | $L_{41}$ | $L_{42}$ | $L_{43}$ | $L_{44}$ | $L_{45}$ | $L_{46}$ .... |
| $d_5$ | $L_{51}$ | $L_{52}$ | $L_{53}$ | $L_{54}$ | $L_{55}$ | $L_{56}$ .... |
| $d_6$ | $L_{61}$ | $L_{62}$ | $L_{63}$ | $L_{64}$ | $L_{65}$ | $L_{66}$ .... |

FIG. 11F

ITERATIVE DISJOINT CLUSTER AND DISCRIMINANT FUNCTION PROCESSING OF FORMATION LOG RESPONSES AND OTHER DATA

FIELD OF THE INVENTION

The invention relates to the processing of data, particularly of sets of depth related formation log responses obtained by moving well logging tools responsive to formation characteristics along borehole(s) penetrating the earth. In a particular aspect, the invention relates to determining how many subpopulations of depth related formation log responses exist in a large population. In a further aspect, the invention relates to determining such subpopulations of sets of depth related log responses as are representative of rock types, porosity zones, density zones, facies, and the like. In a further aspect, the invention relates to correlating such subpopulations of sets of depth related formation log responses between different wells.

SETTING OF THE INVENTION

Boreholes drilled into the earth can provide geological and engineering information to the explorationist. Particularly valuable and reliable information can be derived from extensive lengths of core recovered from the borehole. However, because coring is so expensive, boreholes are usually drilled with an ordinary noncoring bit; and later information is derived about the formations penetrated by the borehole by measuring characteristic properties of the formation, for example, with the aid of wireline logging tools, by seismic profiling, and the like. Typically, the equipment that measures the geophysical properties of the penetrated formations is housed in a sonde which is lowered down the borehole on a wireline cable. On reaching a selected depth in the borehole, the recording circuits are turned on and the responses of the formation to the logging tool (formation log responses) are measured as the sonde is drawn to the surface. The formation log responses are recorded on various media in the form of wireline logs.

Many different responses of the formations can be measured and recorded, such as formation resistivity, sonic velocity, density, radioactivity (gamma ray), and the like. Although the logs may be recorded initially in a continuous analog fashion, the wireline logging data are generally presented for digital computer processing in the form of digitized data at preselected depth intervals, typically, for example, at about 1-ft intervals along the borehole. Thus, for digital computer processing, the formation within such a depth interval is treated as having a single resistivity reading, velocity reading, density reading, and the like. For each depth, there is thus produced a set of formation log responses. It is from such sets of depth related formation log responses that information is obtained concerning the lithology and porosity of the penetrated formations and concerning the type and quantity of fluids (oil, gas, water) within pores.

Sets of depth related formation log responses for different depths are illustrated schematically as a data file in FIG. 11A. Referring to FIG. 11A, for each depth $d_1, d_2, \ldots$, there are log response values $L_{ij}$ for different logs illustrated as Log 1, Log 2, and so forth. Each line of FIG. 11A thus represents a set of depth related formation logging responses, i.e., a set of log responses for a particular depth. Each set of data for a given depth can be referred to as a depth related log suite since it represents a suite of log responses of different logs or logging runs for a particular depth. As indicated above, the values $L_{ij}$, are preferably digitized values for data processing.

Commonly, various subsets of the available log response data are selected for processing and analysis. Referring to FIGS. 11B–F, data excluded from consideration during processing are illustrated enclosed by dashed lines; the data not enclosed by dashed lines thus representing a set of data selected for processing and analysis. In arriving at a dataset for processing, log responses for different kinds of logs can be excluded. Thus, FIG. 11B illustrates that only log responses from Log 1 and Log 2 are included in a dataset for processing; and FIG. 11C illustrates that only log responses from Log 4 and Log 5 are included in a dataset for processing. Alternatively, log responses at particular depths can be excluded as illustrated by FIG. 11D where log responses at depths $d_3$–$d_5$ are excluded from a dataset for processing. FIGS. 11E and 11F illustrate that both kinds of data exclusion can be used to produce a dataset for processing. Thus, FIG. 11E illustrates a dataset of Log 1 and Log 2 for all depths except $d_3$–$d_5$ and FIG. 11F illustrates a dataset of Log 4 and Log 5 for all depths except $d_3$–$d_5$. Other patterns of data exclusion and selection can also occur.

In every case, however, a line of data in a dataset to be processed (i.e. a set of log responses for a depth) is referred to herein as a depth related log suite. In FIGS. 11A and 11D, each depth related log suite comprises all of the log responses for each depth. In FIGS. 11B, 11C, 11E, and 11F each depth related log suite comprises only selected log responses. In FIGS. 11E and 11F, the set of depth related log suites to be processed includes only selected depths and logs; other depths and logs are excluded.

The complete set of data to be processed therefore is a selected set of depth related log suites. The log responses included in a set of depth related log suites for processing are typically selected by the explorationist to provide information about particular formation characteristics, such as lithology, porosity, and the like, which the explorationists desires to investigate.

There has long been a need to automatically analyze sets of depth related log suites of given wells and to determine the number of subpopulations as a function of depth therein. Such subpopulations, depending on the type of log responses included in the depth related log suites, are representative, for example, of rock types, porosity zones, density zones, facies zones, and the like along the borehole. After determining the number of subpopulations which exist, then each subpopulation of depth related log suites could be correlated along the length of the borehole with the appropriate rock type, porosity, density, and the like. This correlation could be made, for example, by comparing the distribution of identified subpopulations along a borehole with core samples or rock samples from the same or a similar well. Then, each depth related log suite which contributed to each subpopulation could be assigned to the appropriate rock type, porosity zone, density zone, and the like. The output from such analysis could also advantageously be presented in a form which could be understood and interpreted by a geologist. In addition, if characteristic functions which correctly classify depth related log suites for an initial well or well(s) into such subpopulations were saved, these functions could be used to classify depth related log suites for additional wells in the same or similar formations where, for example, no core samples or rock samples are available. These and other functions and advantages can be achieved by the invention in accordance with one or another of its various aspects. One significant aspect of the invention is that the present invention operates on the formation log responses and subdivides the depth related log suites into subpopulations based on analysis of the formation log responses themselves. Only after the subpopulations are determined is there correlation of rock type, porosity type, and the like to the identified subpopulations.

PRIOR ART

Busch, "Determination of Lithology from Well Logs by Statistical Analysis," SPE 14301, presented Sept. 22–25, 1985.

GB No. 2 117 146A, "Method for Producing a Recording Characteristic Notably of the Facies of Geological Formations Traversed by a Borehole," published Oct. 5, 1983.

Serra et al. U.S. Pat. No. 4,646,240, "Method and Apparatus for Determining Geological Facies (1987)."

Grosjean, U.S. Pat. No. 4,648,268, "Method of Defining Homogeneous Rock Formation Zones Along a Borehole on the Basis of Logs (1987)."

Baldwin and Morrow, "Identifying Subsurface Facies from User-Directed Computer Processing of Log and Other Data," Association Round Table, p. 462.

Anderberg, *Cluster Analysis for Applications*, Chapter 7, "Nonhierarchical Clustering Methods," (1973).

Davis, *Statistics and Data Analysis in Geology*, pp. 442–456, "Discriminant Functions".

SAS® *Users Guide: Statistics, Version V Edition*, Chapter 16, "The DISCRIM Procedure," and Chapter 18, "The FASTCLUS Procedure," (1985).

SUMMARY OF THE INVENTION

In accordance with the invention, there is provided a method using a computerized data processor for determining subpopulations in a dataset. The dataset entered into the data processor can be a set of depth related log suites or can be other data. The data in the datasets are classified into a selected number $n=a\geq 2$ of disjoint clusters producing a set of $n=a$ disjoint clusters of classified data. Operating on the resulting $n=a$ set of disjoint clusters, a discriminant function is then generated which classifies each datum in the dataset into one of $n=a$ clusters of classified data. Then, a measure representative of the extent to which data classified into $n=a$ clusters by the discriminant function corresponds to data in the $n=a$ disjoint clusters is generated. These three steps are then repeated for different numbers $n=b$, $n=c$, ..., producing a plurality of sets having respectively, $n=a$, $n=b$, $n=c$, ..., disjoint clusters of classified data. Respective discriminant functions and measures are also generated for each set of disjoint clusters. Then, based on and responsive to the measures, a set of the disjoint clusters is selected as representative of subpopulations in the dataset.

In a particular aspect, the method is used for determining subpopulations in a dataset comprising depth related log suites representative of formation characteristics at depths along borehole(s) in the earth. According to this aspect, the dataset being processed in accordance with the invention comprises sets of depth related log suites where the logs included in the suites are selected as representative of certain kinds of formation characteristics.

In a further aspect, the invention comprises evaluating probabilities that the depth related log suites for each of a plurality of depths in a sequence of depths along borehole(s) in the earth contributed to at least some of the disjoint clusters in the set of disjoint clusters selected as representative of subpopulations of responses. Thereafter, representations of thus evaluated probabilities are displayed as a function of depth.

Also, in a further aspect, after selecting the representative set of disjoint clusters, each cluster of depth related log suites is assigned a rock type, porosity domain, facies indicator, and the like and the assignments are displayed as a function of depth.

In a further aspect, after selecting the representative set of disjoint clusters, the discriminant function generated for that set of clusters is used to classify a second set of depth related log suites into subpopulations. The discriminant function can be used to classify sets of depth related log suites of other wells in a formation or in a similar or related formation.

In a further aspect, after selecting the representative set of disjoint clusters, depth related log responses corresponding to at least one subpopulation or cluster can be eliminated or removed from consideration. Then, a set of depth related log suites can be selected from the remaining cluster(s) or subpopulation(s) of depth related formation log responses and processed in accordance with the invention. The set of depth related log suites selected from the remaining subpopulation(s) can comprise the same or preferably different logs from those included in the previously processed set of depth related log suites. The set of depth related log suites selected from the remaining subpopulations can comprise depth related log suites corresponding to only one or to more than one of the subpopulations or clusters.

In another aspect, representative subpopulations of depth related log suites are determined. Then, probabilities are determined representative of the probability that depth related log suites for each of a plurality of depths in a sequence of depths along borehole(s) contributed to at least some of such subpopulations. Then, representations of the thus evaluated probabilities are displayed as a function of depth.

BRIEF DESCRIPTION OF THE DRAWINGS

FIG. 10 illustrates a display in accordance with the invention of lithology probabilities as a function of depth together with a display of the logging responses used to generate the display in accordance with the invention.

FIGS. 11A-11F illustrate schematically various sets of depth related log suites.

DETAILED DESCRIPTION OF THE INVENTION

Figure 1:
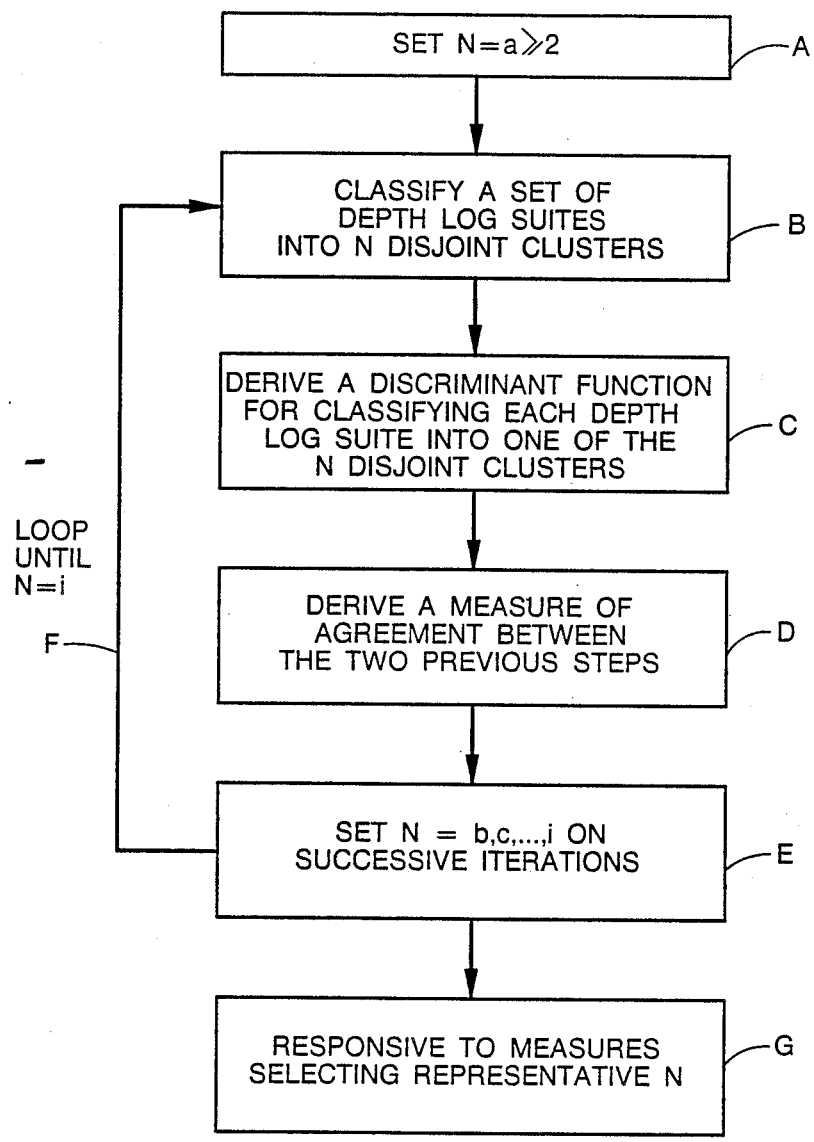
FIG. 1 represents a simplified flow diagram for selecting a particular set of subpopulations of depth related log suites as representative of actual subpopulations in a set of depth related log suites.
Figure 2:
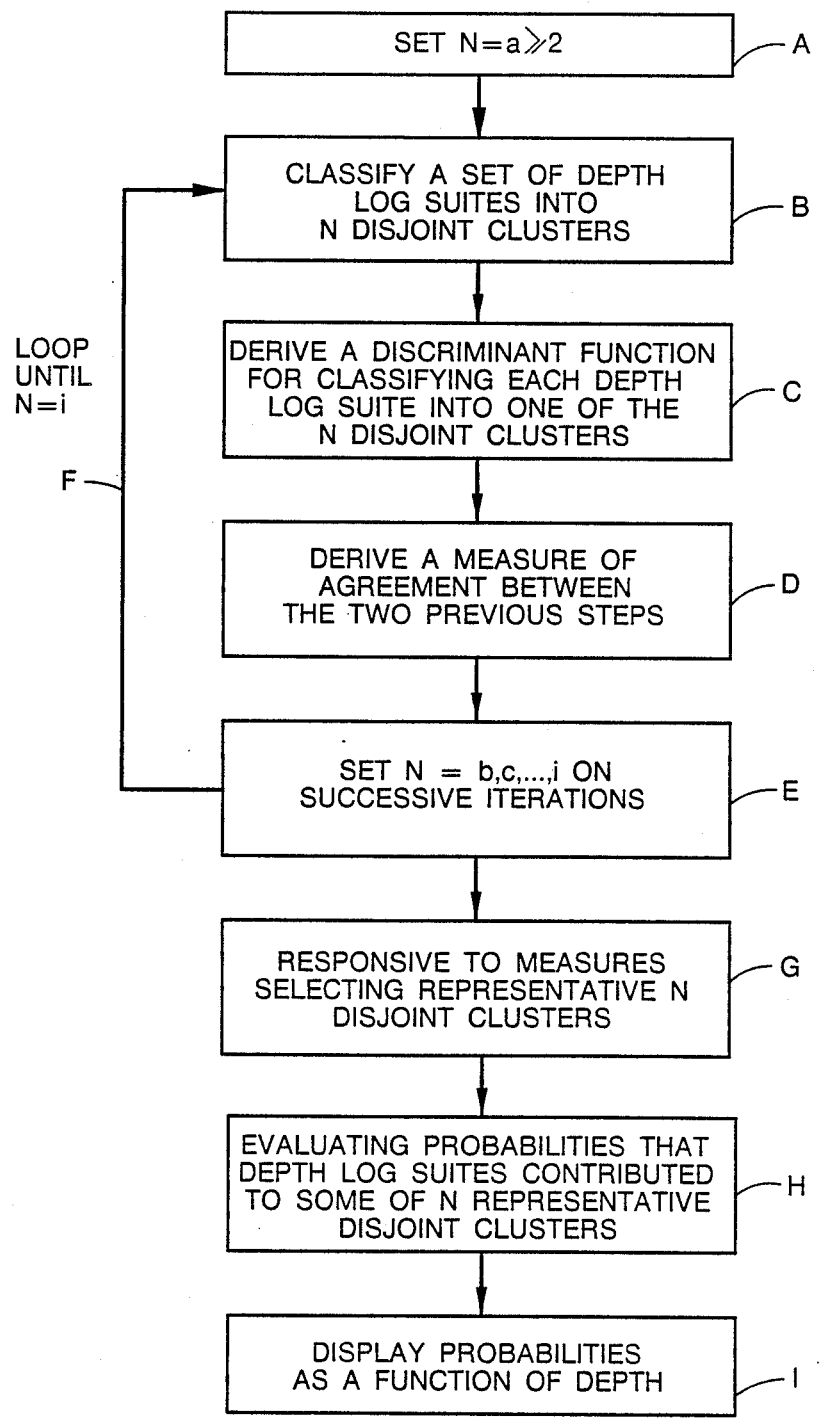
FIG. 2 represents a simplified flow diagram for selecting such a particular set of subpopulations and for generating a display of probabilities as a function of depth that depth related log suites at depths along borehole(s) contributed to at least some of the subpopulations in the particular set.
Figure 3:
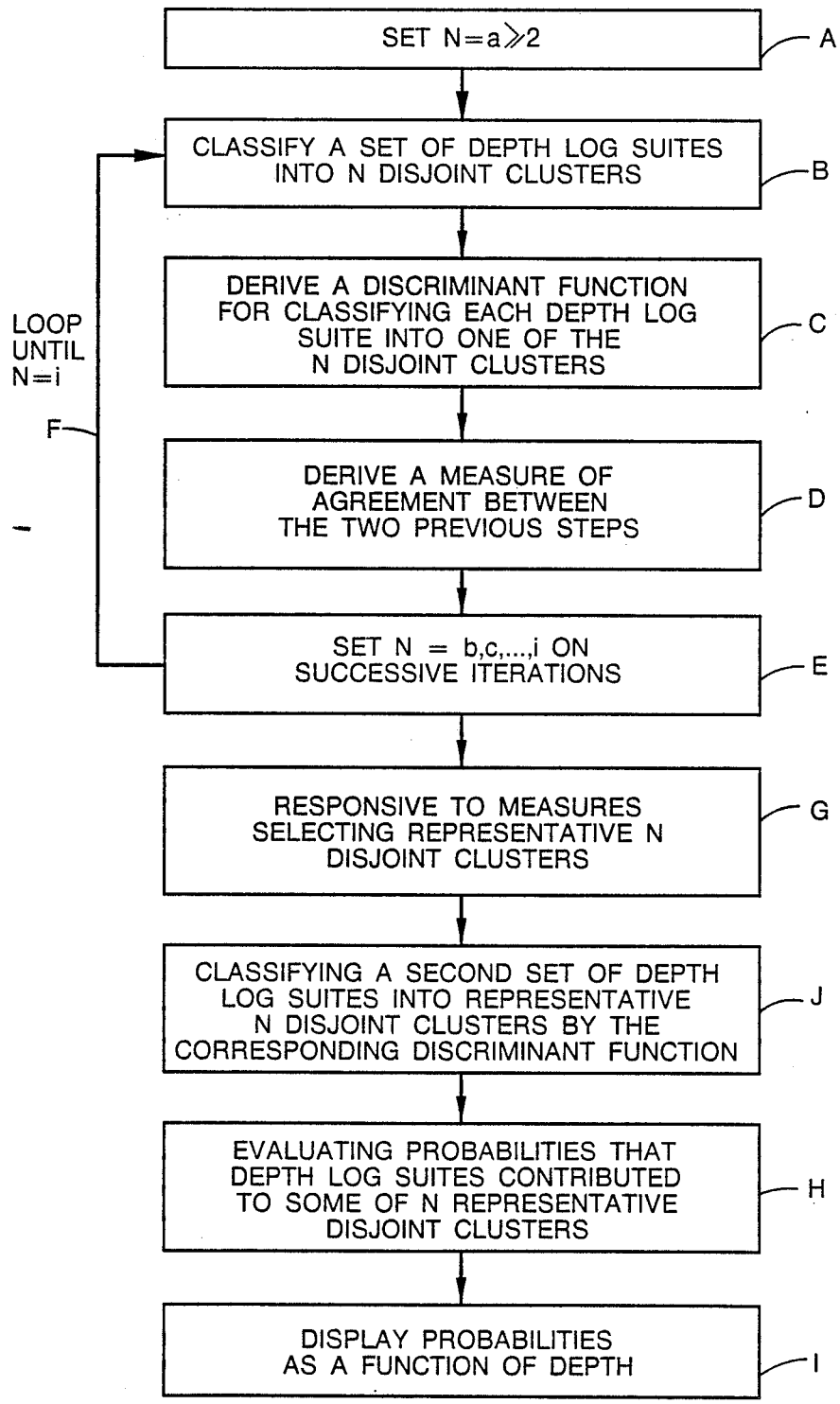
FIG. 3 represents a simplified flow diagram for selecting such a particular set of subpopulations and for using a discriminant function representative of the set for classifying a second set of depth related log suites into representative subpopulations of depth related log suites, and for generating a display of probabilities as a function of depth that depth related log suites at depths along borehole(s) contributed to certain of the subpopulations.
Figure 4:
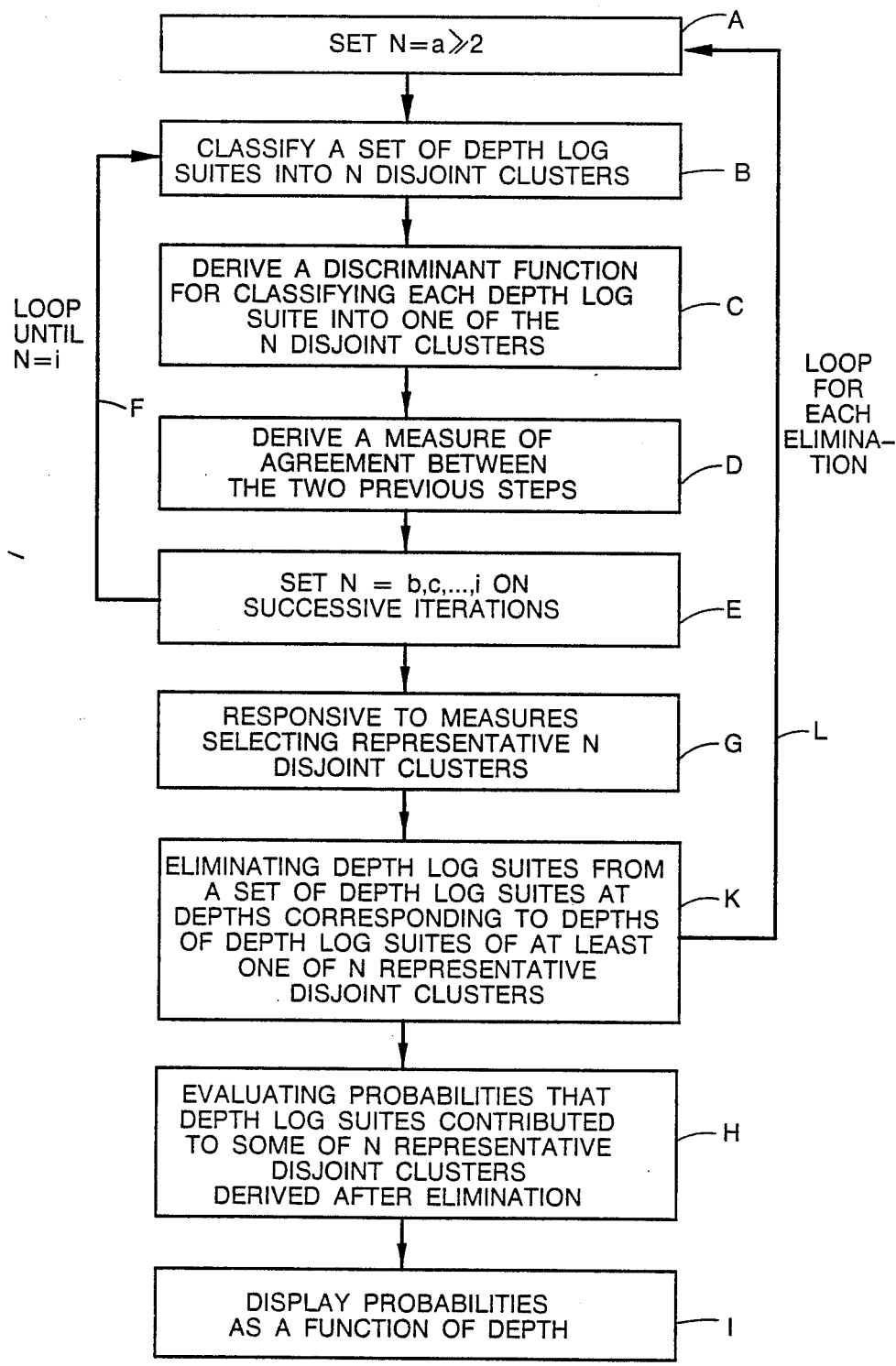
FIG. 4 represents a simplified flow diagram for selecting such a particular set of subpopulations, then, in the same or a different set of depth related log suites, eliminating or removing from consideration depth related log suites corresponding depth related log suites of at least one subpopulation of the selected set, then processing the remaining set of depth related log suites and generating a display of probabilities according to the invention. The steps of eliminating or removing from consideration such subpopulations of depth related log suites and processing the remaining dataset in accordance with the invention can be repeated.
Figure 5:
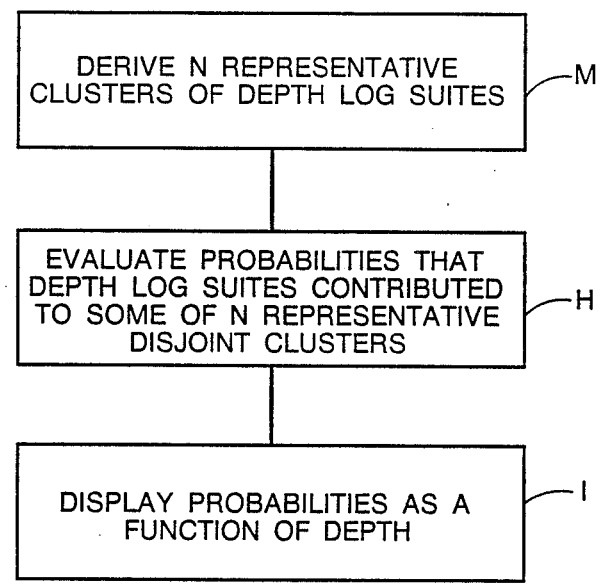
FIG. 5 represents a simplified flow diagram for classifying a set of depth related log suites into representative subpopulations and for generating a display of probabilities that depth related log suites at depth along borehole(s) contributed to at least some of the representative subpopulations.

According to a feature of the invention, data in datasets (for example, depth related log suites in a set of depth related log suites comprising responses from selected well logs such as resistivity logs, sonic velocity logs, density logs, gamma ray logs, and the like) are classified into a number $n=a\geq 2$ of disjoint clusters producing a set of n clusters of classified data. This step is illustrated in FIGS. 1-4 by reference letter B. This classification step results in a number $n=a$ of disjoint clusters, i.e., each datum of the dataset is classified into at most one of the n clusters. The disjoint clustering technique used in accordance with the invention is thus distinguished from hierarchical clustering techniques which for a set of m data would give m nested classifications from m clusters of one member each to one cluster of m members. Such hierarchical clustering techniques, therefore, differ from the disjoint clustering technique used in accordance with the invention by assigning each datum into more than one cluster. As a consequence unlike hierarchical classification techniques, disjoint clustering techniques as used in accordance with the invention requires specification of the number of subpopulations or clusters into which the data are to be classified. This specification of the number can be initialized by the user or by a default instruction, as indicated by reference letter A in FIGS. 1-4, and can thereafter be automatically incremented, as illustrated by loop F.

Disjoint clustering techniques suitable for use in accordance with the invention can be one of many such methods suitable for classifying each datum of a dataset into a single cluster selected from n clusters, where n is specified by the user or by a default specification in a computer program. The disjoint clustering technique is required to assign each datum to one of the n clusters and is not allowed to assign data to any cluster other than the specified n clusters.

Such disjoint clustering techniques form part of the central core of data processing required in accordance with the invention. The disjoint cluster generation step is illustrated by reference letter B in FIGS. 1-4. Such technique is used to provide an initial cluster or group assignment such datum in the dataset. The central core of data processing required in accordance with the invention is illustrated by steps A-G in FIGS. 1-4.

The generation of an initial cluster or group assignment for each datum in the dataset is a primary function of disjoint clustering techniques in the invention since the step of generating discriminant function (discussed below) requires that each datum in the dataset already be assigned to no more than one cluster of a specified n clusters. As discussed in more detail below, disjoint clustering, therefore, is one step in determining how a large dataset can be classified into representative subpopulations or groups and in determining an advantageous number of such subpopulations for the dataset being evaluated.

Disjoint clustering techniques are well known per se, although not in the context in which such are used in the present invention, to those skilled in the art of statistical processing (see, for example, Chapter 7. "Nonhierarchical Clustering Methods," of *Cluster Analysis for Applications* (Anderberg, 1973). Further, statistical analysis programs and software suitable for practicing the disjoint clustering techniques can be readily produced from the available literature and from principles herein described and are also available commercially in the form, for example, of the FASTCLUS procedure of SAS Institute, Inc., Cary, N.C., U.S.A. While further description is not necessary, the following description illustrates standard techniques of disjoint clustering techniques widely known to those skilled in statistical data processing.

In disjoint clustering techniques, some initial partition of the data is selected and then cluster memberships are altered so as to obtain a better partition. The dataset can initially be partitioned into groups or a group of seeds can be found around which clusters may be formed. A set of n seed points can be selected for use as cluster nuclei around which the data can be grouped. The simplest method of generating the n seed points is to choose the first n data in the dataset as the seed points. However, many other methods for selecting seed points can be used (see, for example, Anderberg, op. cit.). Alternatively, the dataset can initially be partitioned into mutually exclusive clusters without necessarily initially finding a set of seed points; seed points can be used however. For example, for a given set of seed points, each datum can be assigned to the cluster built around the nearest seed point. Alternatively, given a set of seed points, each seed point can be treated as a cluster of one member, then data can be assigned one at a time to the cluster with the nearest centroid, and then after each datum is assigned to a cluster, the centroid can be updated so that it is a true mean vector for all of the data currently in that cluster. Other techniques can also be used (see Anderberg, op. cit., and *SAS* ® *User's Guide: Statistics, Version 5 Edition*, Chapter 18, "The FAST-CLUS Procedure," (1985).

According to a feature of the invention, a discriminant function is generated for the set of n clusters produced as a result of a preceding step of disjoint cluster classification. The step of discriminant function generation is illustrated by reference letter C in FIGS. 1-4. This step of the invention is a step of discrimination and is clearly distinguished from the preceding step of disjoint cluster classification. Disjoint cluster classification is the process of assigning data into n groups or clusters that are both relatively homogeneous and distinct from other clusters. By way of distinction, discrimination as used in the invention is the process of finding the linear combination of variables which produces the maximum difference in multivariate space between groups or clusters previously classified by disjoint cluster classification.

There are several clear differences between disjoint cluster classification and discriminant function analysis. Disjoint cluster classification is internally based; that is, it does not depend on priori knowledge about relations between data as does the discriminant function analysis. The number of clusters analyzed by discriminant function analysis is set prior to the analysis, while in contrast, the memberships of clusters that will emerge from a disjoint cluster classification scheme cannot ordinarily be predetermined. Similarly, each original datum is defined as belonging to an already defined specific group in a discriminant function analysis. In disjoint cluster classification procedures, a datum is free to enter any cluster that emerges. Other differences will be apparent to those skilled in the art of statistical analysis.

Figure 6:
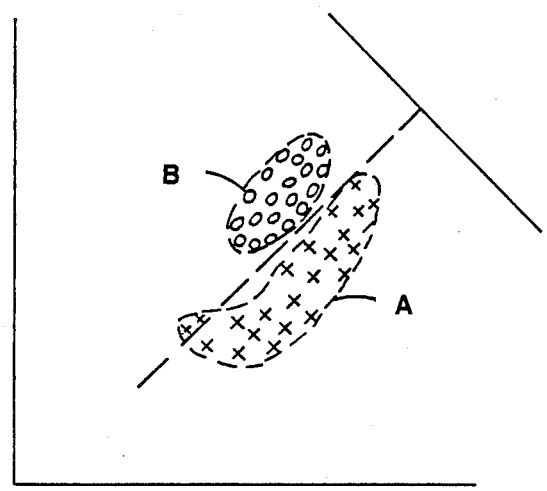
FIG. 6 illustrates in 2-space disjoint cluster analysis and discriminant function analysis applied to the same population of data.

Discriminant function generating programs are well known per se, though not in the context in which such are used in accordance with the present invention (see, for example, Davis, op. cit., pages 442-456). Further, statistical analysis software suitable for practicing the step of generating discriminant functions in accordance with the invention can be readily produced from the available literature and is also available commercially in the form, for example, of the DISCRIM software program of SAS ® Institute, Inc., Cary, N.C. U.S.A. While further description is not necessary, the following description illustrates standard techniques of discriminant function generation widely known to those skilled in statistical processing and will be helpful in understanding the invention. Such a procedure is illustrated by FIG. 6. FIG. 6 illustrates two clusters A and B produced by disjoint cluster processing and further shows by a dashed line, a discriminant function effective for classifying data into clusters A and B. As illustrated in FIG. 6, classification by the discriminant function results in 2 reclassifications since two of the data points in cluster A are reassigned by the discriminant function to cluster B.

Discriminant function analysis consists or finding a transform which gives the minimum ratio of the difference between the multivariate means of the two clusters to the multivariate variance within the two clusters. Thus, referring to the two clusters of data in 2-space, illustrated in FIG. 6, discriminant function analysis searches for the one axis of orientation (indicated by the dashed line) along which the two clusters have the greatest separation while simultaneously each cluster has the least inflation. The coordinates of this axis of orientation, shown by the dashed line, are the linear discriminant function.

It will be appreciated that 2-space has been illustrated in FIG. 6 for purposes of simplicity; however, discriminant function analysis is effective generally in n-space.

As applied to processing a set of depth related log suites, discriminant function analysis will find a discriminant function for classifying depth related log suites into the specified set of clusters in n-space, where n is determined by the number of types of logs included in a particular set of depth related log suites. If two types of formation log responses are included for each depth, the result is 2-space; if three types of log response are included, the result is 3-space; and so forth.

It is noted that the number of clusters and the dimensionality of space in which the clusters occur are not related. For example, there can be four clusters in 2-space or two clusters in 4-space, and in both cases the clusters may represent the actual number of subpopulations existing in the respective space.

According to a feature of the invention, a measure can be generated of the extent to which data classified into n disjoint clusters by disjoint cluster techniques correspond to data classified into the n disjoint clusters by the discriminant function produced by operation of discriminant function analysis on the n disjoint clusters. This step of generating a measure of agreement/disagreement between disjoint cluster analysis and discriminant function analysis is illustrated by reference letter D in FIGS. 1-4. Such a procedure is illustrated by the foregoing discussion of FIG. 6, which indicates that some members (2 members in the illustrated case of FIG. 6) of one disjoint cluster may and often will be reclassified by the discriminant function into other of the disjoint clusters.

A suitable measure of agreement/disagreement can, therefore, consist of counting for each of n disjoint clusters generated by the disjoint cluster classification, how many reclassifications result when the data are reclassified using the discriminant function generated by operating on the n disjoint clusters. This is the simplest form of measure; however, any suitable measure of reclassification by the discriminant function can be used.

Where the number n of disjoint clusters produced by disjoint cluster analysis exceeds the number of clusters which the discriminant function generated by discriminant function analysis is effective for classifying data into, such a result will be apparent from the measure of reclassification. In effect, one or more of the n disjoint clusters will have no data assigned to it by the discriminant function when the n number of disjoint clusters is too large, (as determined by discriminant function analysis); and when n is too small, the number of reclassifications will be clearly greater than for a more optimal number n.

Procedures for generating measures of reclassification are well known per se, though not in the context in which such are used in the present invention to evaluate which of a set of $n=a$, $n=b$, $n=\ldots i$ disjoint clusters produced by disjoint cluster classification is most representative of a population of data. Procedures for generating measures of reclassification per se frequently form a part of discriminant function software (see, for example, Davis, op. cit., pages 442–456). However, it is believed that heretofore it has not been appreciated or recognized, that by first performing disjoint cluster analysis and then discriminant function analysis for the resulting clusters, the measure of reclassification could be used to evaluate how representative the clusters are which were produced by disjoint cluster analysis. Further, statistical analysis software suitable for practicing this step of generating measures of reclassification by the generated discriminant function can be readily produced from the available literature and is also available commercially in the form, for example, of the DISCRIM Procedure of SAS ® Institute, Inc., Cary, N.C. U.S.A. However, as indicated, prior to the making of the invention described herein, such procedures have not been used for producing measures of agreement/disagreement between clusters produced by disjoint cluster analysis and the same data reclassified by discriminant function analysis; nor have the steps been iterated for different numbers of such clusters to provide a basis for selecting the most representative group of subpopulations in a data set.

The foregoing discussion of the discriminant function generation and of the step of generating a measure of reclassification is illustrative of only two variables (logs) of interest. In fact, two, three, four, or more variables may be of interest in the present invention, for example, the depth related log suites can comprise log responses of selected ones of density logs, porosity logs, dielectric logs, radioactivity logs, etc. In such cases, the discriminant function is effective for partitioning in multivariate space corresponding to the number of variables (logs) of interest. The use of discriminant functions for partitioning multivariate space is also well known, per se and forms a part of commercially available discriminant function software packages. However, such are not believed to have heretofore been used to evaluate which of a set of $n=a$, $n=b$, ..., $n=i$ disjoint clusters produced by disjoint cluster analysis is most representative of a population of data, and it is this use which is an aspect of the invention.

According to a feature of the invention, the three steps in accordance with the invention discussed above (classifying data into n disjoint clusters, generating a discriminant function for classifying data into the n disjoint clusters, and generating a measure of reclassification by the discriminant function) are repeated for $n=a$, $n=b$, $n=c$, ... different numbers. The results are sets of a, b, c, ... disjoint clusters, respective discriminant functions for classifying data into the a, b, c, ..., disjoint clusters, and corresponding respective measures of reclassification for the discriminant function classifying data into a, b, c, ... disjoint clusters. This repetition of steps is indicated in FIGS. 1–4 by reference letter E and by loop F. This repetition of steps is sometimes referred to herein as "iterative disjoint cluster analysis and discriminant function analysis" or "iterative DCA/DFA".

The numbers a, b, c ... which determine the number n of clusters into which disjoint cluster analysis will classify data are selected to encompass the number of subpopulations of data likely to exist in a given population. How many numbers a, b, c ... (i.e., what plurality of numbers, a, b, c ...) need to be investigated can be determined empirically either by using results of analysis in accordance with the invention or by previous experience or even by expectation of the user. In accordance with the invention, at least two numbers, a, b, must be used to provide a basis for comparison of the measures of reclassification respectively generated. For many geologic applications, a set of five numbers, for example, $a=2$, $b=3$, $c=4$, $d=5$, $e=6$, will suffice because most often the number of sets of subpopulations of geological logging data having a range of variability which can be distinguished by discriminant function analysis will be in this range of numbers. Conveniently, when using computerized data processing, the size of n can be set by the operator as illustrated by reference letter A in FIGS. 1–4 and then the data processor can be programmed to iterate the steps B to E until a desired number of iterations have occurred.

Experience has shown that the smallest measure of reclassified observations by comparison of disjoint cluster and discriminant function generated groups occurs at a smaller number n than the number n where discriminant function analysis indicates that fewer than n groups exist. Moreover, experience has shown that once these numbers n become such that the discriminant function fails to find as many clusters n as produced by the disjoint cluster classification step, then the discriminant function will also fail to define n clusters for larger values as well.

These facts can be used in accordance with a feature of the invention to determine the representative number of subpopulations in a set of data. This problem of determining the characteristic or representative number of subpopulations in a set of data is a significant problem in statistical analysis of data. The *SAS ® User's Guide: Statistics Version V Edition* (1985) states unequivocally:

There are no satisfactory methods for determining the number of population clusters for any type of cluster analysis.

*The SAS ® User's Guide* contains separate descriptions of each of FASTCLUS (a disjoint clustering technique) and DISCRIM (a discriminant function analysis technique) procedures. The method according to the invention, however, uses disjoint cluster classification and discriminant function analysis in combination as described herein to provide a method for determining the number of population clusters for disjoint cluster analysis. The method moreover has proved satisfactory in every application tested; and provides particularly advantageous results when used to process formation log responses in a set of depth related log suites.

Thus, according to a feature of the invention, a set of clusters representative of subpopulations in a dataset is selected responsive to the measures of reclassification for the iterated number of clusters $n=a$, $n=b$, $n=c$ ... and their respective discriminant functions. By comparing the number of reclassifications for discriminant functions for each of $n=a$, $n=b$, $n=c$ ... disjoint clusters, the set of clusters $n=K$ where K is a, b, c ... is selected where the discriminant function has the smallest measure representative of reclassified data. If two (sequential) numbers, $n=b$, $n=c$, have similar values of reclassification, K can be either b or c. This step of selecting the numbers $n=K$ of representative of subpopulations of a dataset set is indicated at G on FIGS. 1–4.

Referring again to FIG. 6, FIG. 6 illustrates the use of disjoint cluster classification and discriminant function analysis in combination for determining the number of disjoint clusters in a population. Thus, FIG. 6 shows that when disjoint cluster classification is used to create two disjoint clusters, the resulting discriminant function, illustrated by the dashed line, results in two reclassifications since the discriminant function assigns two of the data points of cluster A to cluster B.

Those skilled in multivariate analysis will appreciate that more than two groups cannot be properly represented in 2-dimensions, but that the technique works effectively for n dimensions.

The invention will be further understood and appreciated from the following Example:

EXAMPLE I Iterative Disjoint Cluster Analysis and Discriminant Function Analysis A population of depth related log suites is processed in accordance with the invention by performing disjoint cluster classification, discriminant function analysis and generating measures of disagreements for $n = 2, 3, 4, 5,$ and 6. the results are shown in Tables 1–6.

TABLE 1

| Disjoint | TWO SUBPOPULATIONS Classification by Discriminant Function | | |
|---|---|---|---|
| Cluster | 1 | 2 | Total |
| 1 | 90 | 1 | 91 |
| 2 | 0 | 9 | 9 |

Table 1 shows that the generated discriminant function reassigned one member of disjoint cluster no. 1 to cluster no. 2.

TABLE 2

| Disjoint | THREE SUBPOPULATIONS Classification by Discriminant Function | | | |
|---|---|---|---|---|
| Cluster | 1 | 2 | 3 | Total |
| 1 | 9 | 0 | 0 | 9 |
| 2 | 0 | 3 | 0 | 3 |
| 3 | 0 | 0 | 88 | 88 |

Table 2 shows that the generated discriminant function for the three disjoint clusters produced no reclassifications.

TABLE 3

| Disjoint | FOUR SUBPOPULATIONS Classification by Discriminant Function | | | | |
|---|---|---|---|---|---|
| Cluster | 1 | 2 | 3 | 4 | Total |
| 1 | 2 | 0 | 0 | 0 | 2 |
| 2 | 0 | 88 | 0 | 1 | 89 |
| 3 | 0 | 0 | 3 | 0 | 3 |
| 4 | 0 | 0 | 0 | 6 | 6 |

Table 3 shows that the generated discriminant function reassigned one member of disjoint cluster no. 2 to cluster no. 4.

TABLE 4

| Disjoint | FIVE SUBPOPULATIONS Classification by Discriminant Function | | | | | |
|---|---|---|---|---|---|---|
| Cluster | 1 | 2 | 3 | 4 | 5 | Total |
| 1 | 3 | 0 | 0 | 0 | 0 | 3 |
| 2 | 0 | 61 | 1 | 0 | 4 | 66 |
| 3 | 0 | 0 | 6 | 0 | 0 | 6 |
| 4 | 0 | 0 | 0 | 2 | 0 | 2 |
| 5 | 0 | 0 | 0 | 0 | 23 | 23 |

Table 4 shows that the generated discriminant function reassigned one member of cluster no. 2 to cluster no. 3 and reassigned four members of cluster no. 2 to cluster no. 5.

TABLE 5

| Disjoint | SIX SUBPOPULATIONS Classification by Discriminant Function | | | | | | |
|---|---|---|---|---|---|---|---|
| Cluster | 1 | 2 | 3 | 4 | 5 | 6 | Total |
| 1 | 6 | 0 | 0 | 0 | 0 | 0 | 6 |
| 2 | 0 | 0 | 0 | 0 | 0 | 1 | 1 |
| 3 | 1 | 0 | 49 | 2 | 0 | 0 | 0 |
| 4 | 0 | 0 | 0 | 17 | 0 | 0 | 0 |
| 5 | 0 | 0 | 3 | 0 | 19 | 0 | 0 |
| 6 | 0 | 0 | 0 | 0 | 0 | 2 | 2 |

Table 5 shows that the generated discriminant function reassigned one member of cluster no. 3 to cluster no. 1 and two members of cluster no. 3 to cluster no. 4. The function also reassigned three members of cluster no. 5 to cluster no. 3. Table 5 also shows that the generated discriminant function could not distinguish between cluster no. 2 and cluster no. 6 and, hence, assigned members of both cluster no. 2 and cluster no. 6 to one cluster (no. 6).

Figure 7:
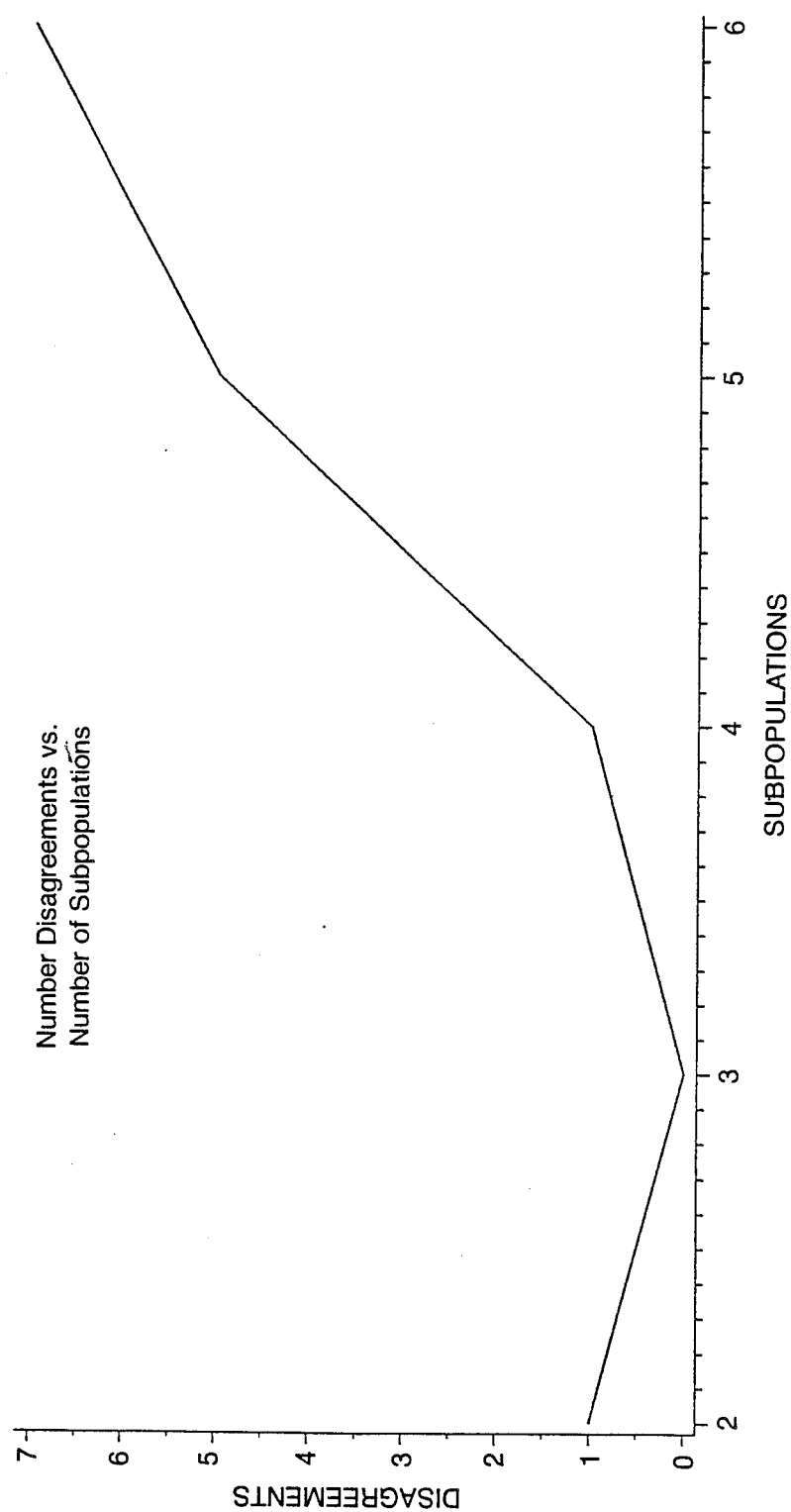
FIG. 7 illustrates the synergistic use of disjoint cluster analysis and discriminant function analysis for determining representative subpopulations of a set of depth related log suites in accordance with the invention

The number of disagreements is plotted against the number of subpopulations in FIG. 7. The fewest disagreements (0 disagreements) occur at $n = 3$. FIG. 7 represents the results obtained with a particular dataset. It is not necessarily the case that there will be zero disagreements as shown in this Example when the results of disjoint cluster analysis and discriminant function analysis best agree. In every case, however best agreement is indicated for the set of n groups where the number of disagreements is least. Based on these results, it is determined that $n = 3$ disjoint clusters produced by disjoint cluster analysis are representative of the population.

Thus, by using disjoint cluster techniques in combination with discriminant function techniques in accordance with the invention, it is determined that the disjoint cluster technique producing three disjoint clusters provides a set of clusters representative of the population. This determination is made using a technique other than the disjoint cluster technique itself, specifically by using discriminant function analysis.

Following such selection of a particular set of clusters (i.e., subpopulations) as representative of the population of data, each observation in the initial dataset can be given a group assignment number or index which indicates into which group of the $n = K$ groups each observation is assigned. It will be apparent to those skilled in the art of data processing that such group assignment numbers or indexes can be used for generating various displays in accordance with the invention as hereinafter described.

As indicated above, discriminant function analysis consists of finding a transform in multivariate space which gives a minimum ratio of the differences between the multivariate means of clusters to multivariate variance within the clusters. A consequence is that multivariate variance within the clusters cannot be distinguished by discriminant function analysis when the differences between multivariate means of different clusters become too large.

Accordingly, a further feature of the invention comprises, following determining a representative number $n=K$ of subpopulations of data in a dataset, the step of eliminating or removing from consideration data constituting one or more of the K depth clusters and repeating the steps of the invention in its various aspects for the remaining clusters of data. This feature of the invention is illustrated by step K and loop L in FIG. 4.

As applied to processing of depth related log suites, this technique can be implemented as follows.

A set of depth related log suites is selected which is expected to be representative of a particular variable of interest such as, for example, a particular lithology. For illustration, in the set of depth related formation log responses in FIG. 11A, a set of depth related log suites such as illustrated in FIG. 11B or FIG. 11C can be selected. The invented method is used to determine how many subpopulations of depth related log suites exist as a function of depth in the set. Then, for example, by correlation with cores or other information, the subpopulations corresponding to particular lithology (ies) can be identified. Then, the depths corresponding to the depth related log suites in that subpopulation can be used to exclude from consideration log responses at that depth. Thus, referring to FIG. 11C, a depth cluster is indicated by bracketing $d_3$–$d_5$, and referring now to FIGS. 11D, E, F, the formation log responses of depths $d_3$–$d_5$ corresponding to the cluster have been excluded from consideration. Alternatively, the subpopulation of formation log responses at $d_3$–$d_5$ can itself be selected for further processing in accordance with the invention.

The set of depth related formation log responses minus the depth related log suites attributed to a particular lithology can be again processed in accordance with the invention. The same log responses can be included in the set of depth related log suites being processed as before. For illustration, compare FIGS. 11B and 11E or alternatively FIGS. 11C and 11F, where the same logs are included in sets of depth related log suites before and after exclusion of a depth subpopulation from consideration. Preferably, however, another set of formation log responses, for example, representative of another particular lithology, can be selected, and the resulting set of depth related log suites can be processed in accordance with the invention. For illustration, compare FIGS. 11B and 11F, or alternatively FIGS. 11C and 11E, where different logs are included in sets of depth related log suites before and after exclusion of a depth subpopulation from the set of depth related formation log responses.

These steps can be repeated as desired.

It will be apparent that 1, 2, or more subpopulations can be removed from consideration and that, therefore, the remaining set of subpopulations can include 1, 2, or more subpopulations. As applied to log analysis this means, for example, that after identifying a particular subpopulation, the invented method can be used to further subdivide that subpopulation or can be used to subdivide remaining sets of subpopulations after removal of the particular subpopulation.

This feature of the invention can lead to particularly significant results in lithological analysis. Thus, Example II below shows that in an original set of depth related log suites, only two subpopulations of data ($K=2$ clusters) are identified by the invented process. One cluster is determined to correspond generally to coals and the other cluster is determined to correspond generally to all other rock types represented by the dataset. Further identification of subpopulations could not be directly achieved on the original set of depth related log suites using the invented process. However, by removing data representative of the coals from consideration (that is, by removing from consideration formation log responses at depths associated with "coals"), and selecting a different suite of logs, the remaining depths can be split into three groups representative of shales, sandstones, and volcanics. By further eliminating from consideration formation log responses at depths representative of the sandstones and volcanics, and again selecting a different suite of logs, the remaining depths representative of shales were found to have five identifiable subpopulations or types of shale.

EXAMPLE II Effect of Eliminating Subpopulations of Data

A set of depth related formation log responses including spherically focused (SF), density (DN), spontaneous potential (SP), gamma-ray (GR), apparent grain density (RGAPP) cation exchange capacity (CEC), and delta density (DLTDN) logs are prepared from raw logging data in the usual way and processed in accordance with the invention.

Figure 8:
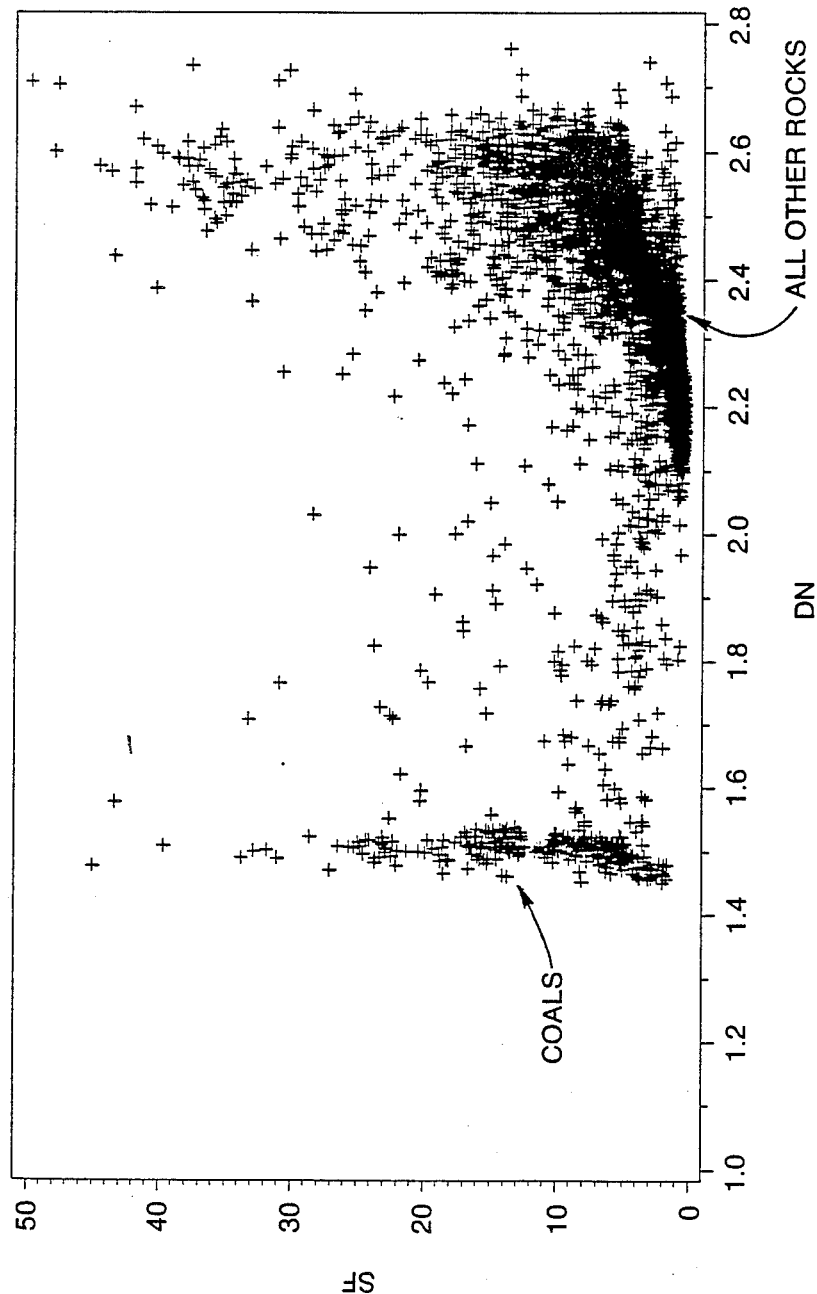
FIG. 8 is a cross plot of spherically focused log data (SF) and density log data (DN) illustrating that two groups of data exist, which in the illustrated example are identified as "Coals" and "All Other Rocks".

Initially, a comparison of a cross plot of SF and DN log data, illustrated in FIG. 8, indicates two groups of rocks are present. Disjoint cluster analysis and discriminant function analysis performed on depth related log suites comprising the SF and DN data confirms that two groups of rocks are present. By comparison with core samples from the well and other available information, one of the groups is identified as coals and the other group is considered to comprise all other rock types present. The groups are so identified in FIG. 8. The depths associated with the coals are labeled as coals and not included in the datasets subjected to iterative DCA and DFA in accordance with the invention described below. The labeling of data (formation log responses at identified depths) as coals is preferably handled by computer. It is emphasized that although labeling is handled by computer, the identification or correlation of clusters as representative of particular variables, i.e., lithologies, facies types, and so forth, is achieved by comparison with other known data.

Figure 9:
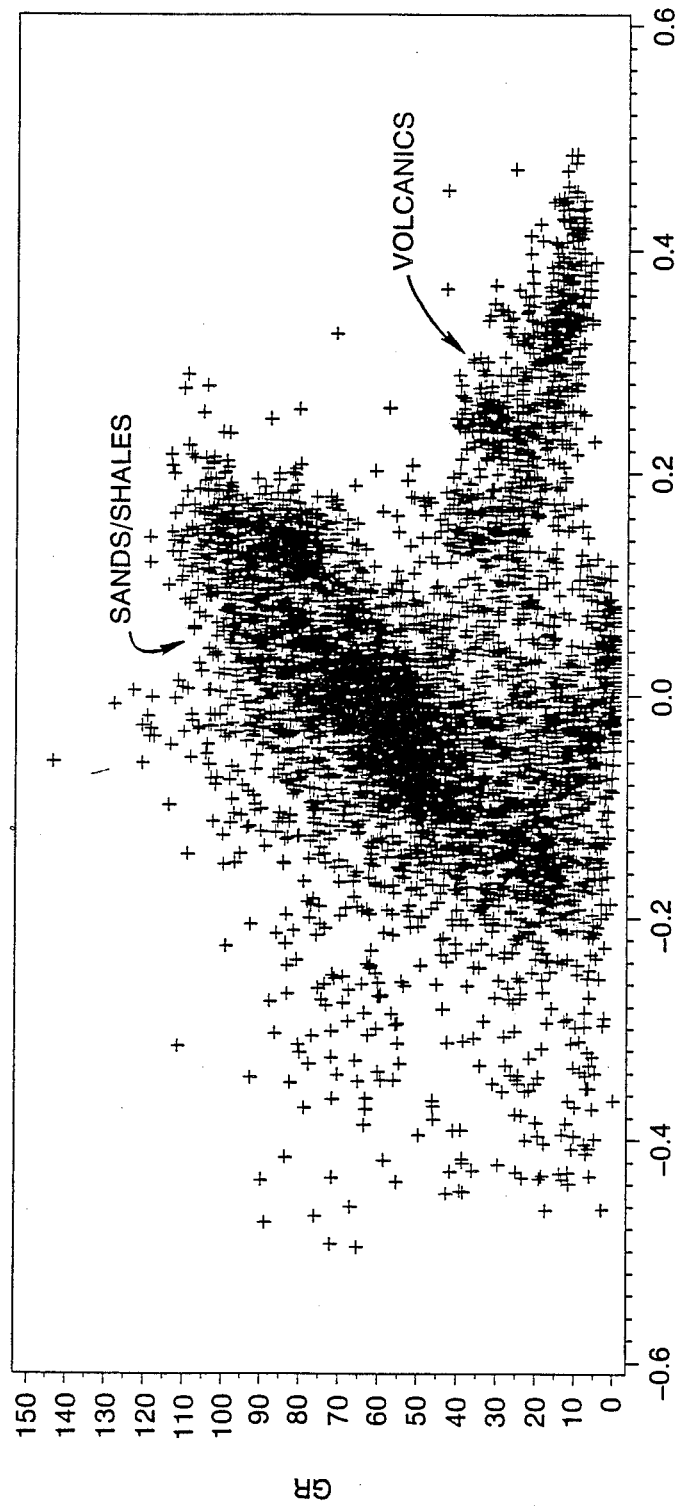
FIG. 9 is a cross plot of gamma-ray logging data (GR) and delta density log data (DLTDN) remaining in a dataset after depth related log suites representative of coals have been removed from consideration and illustrates the effect of elimination of subpopulations of depth related log suites on resolution of remaining depth related formation log responses in a set of depth related formation log responses into representative subpopulations of responses which in the illustrated example are identified as "Sands/Shales" and "Volcanics".

Crossplots of GR, DLTDN, and CEC data (illustrated by FIG. 9 showing a crossplot of GR and DLTDN data) indicate that the GR, DLTDN, and CEC curves can be used to separate volcanics from sandstones and shales. Iterative DCA/DFA analysis in accordance with the invention of the depth related log suites comprising GR, DLTDN, and CEC data is used to separate volcanics from the sandstones and shales. The iterative DCA/DFA in accordance with the invention yields two groups one of which can be correlated with volcanics by comparison with other available information. The depths thus associated with volcanics are labeled as volcanics and not included in the dataset subjected to the next run of iterative DCA and DFA analysis in accordance with the invention described below.

A dataset of depth related log suites comprising RGAPP and SP logs, of which the depth related log suites associated with coals and volcanics are not taken into account, is subjected to iterative DCA/DFA in accordance with the invention and two groups which are identified as sandstones and shales are separated. The depths associated with sandstones and shales are labeled.

Each depth of the original dataset now is labeled as coal, volcanic, sandstone or shale. The depth related log suites representative of sandstones and shales are each again processed in accordance with the invention and the sandstones are further subdivided into three sandstone types and the shales are further subdivided into five shale types. The posterior probability of assigning the depth interval to each group representative, for example, of rock type, is also calculated and tabulated by depth interval. Where the posterior probability can be determined for assignment of the depth interval to other rock types, those posterior probabilities can also be tabulated. The final result is, in effect, a table with data entries of the form:

(d, $A_1$, $A_2$, $P_1$, $P_2$)

where d is the depth, $A_1$ is the primary rock type assignment, $A_2$ is the secondary rock type assignment, $P_1$ is the posterior probability of assigning the depth interval to the group representative of the primary rock type, and $P_2$ is the posterior probability of assigning the depth interval to the group representative of the secondary rock type.

It is noted that posterior probabilities for tertiary, quaternary, and further assignments can also be calculated, tabulated, and displayed if desired. Preferably, the posterior probabilities for the primary and secondary assignments ($P_1$ and $P_2$) are normalized to 1 and the normalized values are recorded by depth.

The resulting, preferably computerized dataset, can then be displayed as a function of depth by assigning, for example, a different color or other visual symbol to each of coals, volcanics, sandstones, and shales and displaying the (preferably normalized) posterior probabilities as series of longitudinal bar charts as a function of depth. Such a display is illustrated in FIG. 10. The subdivision of sands and shales is not illustrated in FIG. 10 for simplicity.

Referring now to FIG. 10, FIG. 10 illustrates a display in accordance with the invention of lithology posterior probabilities as a function of depth, together with a display as a function of depth of the formation log responses on which iterative DCA/DFA operated to generate the display in accordance with the invention.

Thus, FIG. 10 shows density (DN), spherically focused (SF), rho grain apparent (RGAPP), cation exchange capacity (CEC), delta density (DLTDN), spontaneous potential (SP), and gamma-ray (GR) formation log responses as a function of depth. Each signal has a range of values shown in the upper right of FIG. 10.

At the left of FIG. 10 is a display of lithology posterior probabilities in accordance with the invention. The posterior probability is indicated for each depth by a horizontal bar graph of the symbol representative of a selected lithology (See Symbols 1–4 at upper left of FIG. 10 assigned to coals, sands, shales, and extrusive volcanics respectively) with magnitude indicated the length of the symbol from left to right. Where a transition is made from one lithology type to another, the lithology assignment having a posterior probability of greater than 50% is shown on the left (see, for example, the depth interval between 7126–7140 ft).

FIG. 10 illustrates that from about 6940 to about 6954 ft, the assignment of depth related log suites to the group identified as representative of sandstones is substantially 100% probable.

Likewise, from about 6954 to about 6964 ft, the assignment of depth related log suites to the group identified to be representative of coals is substantially 100% probable. The presence of various lithology symbols along the right margin indicates, however, that there usually remains some chance that the depth should be assigned to one or another of the other subpopulations. Color symbols are preferred since color can most clearly visually present such information to the explorationist From about 6964 to about 6968 ft, the assignment is predominantly to the group identified to be representative of sandstone; however, in portions of this range, there is a significant probability of assignment to the group identified to be representative of shales. This would typically indicate the presence of shaly sands or sandy shales. At about 6964 ft, the probability of assignment to the group identified to the representative of sandstone and the probability of assignment to the group identified to be representative of shales are about equal.

From about 6968 to about 6986 ft, the probability of assignment to the group identified as representative of extrusive volcanics is substantially 100%. In the central portion of this depth interval and in the interval 6986 to 6988 ft, the absence of the appropriate lithology symbol indicates that data were removed as unreliable during preprocessing.

In the range from about 6988 to about 6996 and in the range from about 7030 to about 7032, data assigned to the group identified as representative of coals again occurs. Likewise, from about 6996 to about 7030 and in the range from about 7034 to about 7126, the group identified as representative of sandstones again occurs.

In the range from about 7126 to about 7138, data belonging to the group identified as representative of shales again occurs, and the shales starting at about 7132 transition into sandstone, the sandstones apparently becoming dominant at about 7138 ft.

According to an aspect of the invention, the population of data subjected to the steps of the invention can be constituted of data representative of particular variables of interest, for example, lithology, facies, porosity, permeability, and the like. Either data selection or data elimination can be used to arrive at the populations of data to be processed in accordance with the invention.

Thus, for example, the initial population of data can be selected to be representative of particular parameters of interest. Those skilled in the art know that certain well logging measurements, such as travel time, neutron logging, and the like, provide information about porosity, that certain well logging measurements, such as the neutron density log, provide information about formation densities; that certain well logging measurements, such as gamma ray (GR) and spontaneous potential (SP), provide information about lithology and so forth. Accordingly, if the purpose of analysis is determination of how many types of porosity, density, lithology, and so forth, exist in a population, the initial set of depth related log suites can be selected to comprise formation log responses which provide information specifically about porosity, density, lithology, and the like, respectively.

Alternatively, following determination of representative subpopulations of formation log responses in accordance with the invention, one or more depth clusters of data can be eliminated from a set of depth related formation log responses and the resulting set of data can be further processed in accordance with the invention to further identify representative subpopulations in the remaining population of data.

Formation log responses to be processed in accordance with the invention can be preprocessed by various techniques known to those skilled in the art and conventional for preparing formation log responses for analysis of various kinds. Thus, unreliable responses (responses from "bad holes") can be eliminated from the population of responses before processing. Data from wells can be made more consistent in regard to depth (depth shifting or correction). Other techniques to correct, modify, or eliminate certain responses can also be applied to the population of well logging processes prior to processing in accordance with the invention. Such preprocessing does not constitute part of the invention; however, failure effectively to preprocess formation log responses prior to using the invention can have deleterious effects on results obtained, just as it can for other methods of processing formation log responses.

There are certain preprocessing steps more particularly related to iterative DCA/DFA analysis which can be considered additional features of the invention.

As an example, discriminant function analysis of disjoint clusters produced by disjoint cluster classification is an important feature of the invention. Discriminant function analysis generally assumes and yields best benefits when the different variables (for example, the different formation log responses included in a set of depth related log suites) being processed are uncorrelated. In accordance with an aspect of the invention, correlation analysis can be performed of the different sets of formation log responses to be included in a selected set of depth related log suites to be processed in accordance with the invention. If relatively high correlations ($\geq 0.6$) exist between sets of formation log responses (i.e., different logs) one or more of the logs can be eliminated. Alternatively, for example, uncorrelated variables can be created from the original input variables (logs). For example, factor analysis can be used to create variables called principal components, which by definition are uncorrelated. While the number of principal components may or may or not be the same as the number of original logs, by retaining the principal components almost all of the information contained in the original logs will be retained.

According to this aspect of the invention, principal component coefficients can be used to calculate a "score" (or number) for each depth interval, that is, foot of the well for each retained principal component. A computer can then be used to create a dataset which contains a column of depths corresponding to depths for the original set of formation log responses and columns of scores (one column for each retained principal component) in which each score is the respective score for a respective principal component at that depth. Thus, there will be score values for each principal component for each depth value. This dataset can then be processed in accordance with the invention.

The steps of performing principal component analysis and of calculating scores for such components are well known to those skilled in the art of statistical processing and need not be further described here. Software for such processing can be readily prepared or acquired, for example, the PROC FACTOR program available from SAS Institute, Inc., Cary, N.C.

Other preprocessing steps can include, for example, standardizing the logs, normalizing the logs, and smoothing the logs prior to processing in accordance with the invention. Such steps are individually known to those skilled in the art, though not in the invention context.

Thus, to eliminate the effect of the relative magnitude of the members associated with different variables, the input data can be standardized, for example, by giving every variable, i.e., each log included in a set of depth related log suites, a mean of zero and a standard deviation of one. This is no way affects the absolute or relative information content of the variables. Other standardization techniques can, of course, also be used.

Further, the data can be normalized. Most statistical processing techniques depend upon the fact that the dataset has been created by random selection of observations (data). Such random selection generally will result in a frequency distribution for the dataset which is Gaussian, i.e., a normal bell-shaped distribution. For various reasons, some logs have a skewed frequency distribution. It can, therefore, be desirable to perform transformations of the frequency distribution of such logs prior to including such logs in a selected set of depth related log suites for processing by the invention. The normalization process is relatively simple. For example, if the original dataset is skewed to the "right", then the normalization can simply take the logarithm to the base 10 of the input values, compare the skewness of the resulting log distribution to the skewness of the original distribution, and then select for processing the log dataset with the least skewness. If the distribution of the original log dataset is skewed to the "left", then the data can be transposed such that the skewness is on the "right". Then, the skewness correction can proceed as described above. The log dataset with the least skewness is the one with the most normal distribution, and can be included in a selected set of depth related log suites for processing by the invented method.

Further, the coefficients for the input variables (for example, logs) can be smoothed. Well logging responses are generally noisy, that is, formation log responses usually show greater variation than the actual variation of a measured parameter in the rocks. It is generally also true that variations in the rocks (such as lithologies or porosity zones) exist over more than a single interval of the well. Therefore, it can be desirable to smooth the input variables (logs), for example, by a simple 3-point moving average smoothing routine, well known to those skilled in the art, prior to including such logs in sets of depth related log suites for processing in accordance with the invention.

According to a further aspect of the invention, a feature of the invention is the generation of posterior probabilities to indicate what the probability is that a certain observation (for example, a particular depth related log suite) belongs to a particular cluster of the set of disjoint clusters selected in accordance with the invention as representative of subpopulations in the original population of data. This feature is indicated as step H in FIGS. 2-5.

In principle, the calculation of the posterior probability that a datum should be assigned to a particular cluster t is a measure of distance in multivariate space from the datum to the centroid of cluster t divided by the sum of the distances from the datum to the centroids of other clusters u. One suitable measure is, for example, $$p_t(s) = \frac{\exp(-0.5 \, D_t^2(x))}{\Sigma_u (\exp(-0.5 \, D_u^2(x)))}$$

where $p_t(x)$ is the posterior probability that observation x is assigned to cluster t, $D_t^2(x)$ is the generalized squared distance from x to cluster t, and $D_u^2(x)$ is the generalized squared distance to the other cluster u.

The calculation of posterior probabilities is well known to those skilled in the art and need not be further described here. The calculation of posterior probabilities is also a function accomplished by commercially available discriminant analysis software such as the DISCRIM procedure available from SAS Institute, Inc., Cary, N.C.

According to a further feature of the invention, the posterior probabilities calculated as described above can be displayed as a function of depth along a borehole. This step is indicated as step I in FIGS. 2-5. According to a further aspect of this feature, the two highest posterior probabilities for a given observation at a depth can be normalized to 1.0 (or 100%) and then displayed. Such a display is illustrated in FIG. 10.

As applied to characteristics of subterranean formations, such as porosity, density, lithology, etc., the fact that an individual depth interval is represented by two significantly valued posterior probabilities does not necessarily indicate that particular depth interval to be a transition zone between zones of different porosities, densities, etc. Nevertheless, by displaying significantly valued posterior probabilities along a range of depths in the subsurface and by observing the resulting pattern, such a display as a whole is indicative of zones of porosities, densities, lithologies, etc., and of transition zones therebetween. Such displays can, therefore, provide significant information to the explorationist who can use that information together with other available data. Such a display is shown in FIG. 10 discussed above in connection with EXAMPLE II.

The following discussion will further clarify the use of processing in accordance with the invention in connection with exploration for oil and gas After using the invention to determine the representative set of subpopulations characteristic of the population, each observation (i.e., depth related log suite) in the original population of well logging responses (i.e., set of depth related log suites) can be given a group assignment number which identifies to which of the subpopulations that observation is assigned. Each observation is then given a measure of posterior probability for assignment into that subpopulation and, if desired, a measure of posterior probabilities for assignment into other subpopulations of the representative set of subpopulations determined in accordance with the invention. These steps are illustrated by reference letters M, H and I of FIG. 5.

Then, according to a further aspect of the invention, each subpopulation of the set of representative subpopulation can be assigned a particular porosity, density, lithology, etc. This assignment of porosity, density, lithology, etc., is performed after statistical processing in accordance with the present invention. At this time, after the representative subpopulations of formation log responses have been identified, individual log responses or various subpopulations of responses can be inspected, compared with available core information, and other available information concerning subterranean parameters. Based on this comparison, porosities, densities, lithologies, etc., can be assigned by the explorationist to the different depth subpopulations determined in accordance with the invention to be representative of the populations. Then a display can be generated showing the assigned porosities, densities, lithologies, etc., as a function of depth in a borehole. Desirably, a display of at least the most significant posterior probabilities for the assignment of that depth interval to a specified subpopulation can also be generated and displayed. Such a display is illustrated in FIG. 10.

According to a further aspect of the invention, after selection of a particular number K of clusters as representative of subpopulations for a given population of data (for example, a set of depth related log suites for an initial well), the discriminant function for classifying data into that set $n = K$ of clusters can be used for classifying data from other populations (for example, similar depth related log suites for other wells penetrating adjacent formations). This aspect of the invention illustrated by FIG. 3, generally, and the step is particularly indicated as step J.

There are several advantages associated with this use of saved discriminant functions. First, it can avoid the need for processing each population of formation log responses (i.e., each well) independently, which means that for further wells, the steps of determining what number of depth subpopulations $n = K$ is representative of the population can be foregone. Second, the use of the retained discriminant functions assures that what is identified as a particular density, porosity, lithology, etc., in one well will be identified in the same way in all other wells. This facilitates following a particular parameter across a basin or reservoir. If this aspect of the invention is not used with awareness, however, disadvantages can also result. For example, the saved discriminant function can identify only as many densities, porosities, lithologies, etc., in the second population (second well) as it did in the first population (first well), and there may be, in fact, more subpopulations in the second well than in the first. For example, if there are three rock types in a first well and the discriminant function is saved in this well, this function will not identify a fourth rock type which may exist in the second well. Rather, the fourth rock type in second well may be misclassified as one of the three rock types of the first well or may be classified as "other" in the second well along with everything else the discriminant function could not classify.

A second potential drawback to the saved discriminant function methodology is that even if there are the same number of rock types in two different wells, the discriminant function saved from the first well can only reliably identify the same rock types in the second well as it did in the first well. For example, the first well might contain sandstones, shale, and carbonates. The second well might contain sandstones, shales, and coals. Both wells contain the same number of rock types. However, the saved discriminant function from the first well will not correctly classify the coals in the second well. This is because the saved discriminant function for the third rock type for the first well was specifically formulated to identify the subpopulation of data representative of the carbonates in the first well.

According to a further aspect of the invention, therefore, in order to avoid the aforementioned problems, the construction of a composite dataset can be employed. If the user is working in a basin in which there are, for example, six rock types but no individual well contains all six rock types, a set of depth related log suites comprising logging responses for all six rock types can be composited to produce an initial population of data for generating and retaining discriminant functions in accordance with the invention. This, in effect, constructs a composite well or pseudowell which will contain all rock types that might occur in any real well in the basin being evaluated. A saved discriminant function from the pseudowell can then be used to very quickly correlate all rock types of all wells in the entire basin. This methodology has proved successful and advantageous in basin and reservoir analysis. The creation of composite wells or populations of well logging responses is well known to those skilled in the art of log analysis and can be readily accomplished by them from the description herein.

The following Example III illustrates the use saved discriminant functions generated in accordance with the invention.

EXAMPLE III Use of Saved Discriminant Functions

A composite dataset is constituted for a pseudowell using logs for two wells in a formation. Iterative disjoint cluster analysis and discriminant function analysis in accordance with the invention indicates that there are 4 representative subpopulations of data. By correlation with core analysis results, these subpopulations are assigned rock types. The discriminant functions for the 4 subpopulations are saved and used to classify and generate displays for wells in the formation.

It will be appreciated that the invention provides an advantageous method of assigning data in a dataset into representative subpopulations which can then be correlated with other relevant information. In a described aspect, the dataset can be a set of formation log responses and the correlation can be with such types, porosity zones, density zones, facies zones and the like. However, the invention is not limited to use with formation log responses but can be used with any dataset which it is desired to subdivide into representative subpopulations. The invention is therefore not limited to the particular applications described in detail herein but by the claims appended hereto.

What is claimed is:

1. A method for processing suites of well logs and generating maps of rock distributions in the subsurface comprising:
   (I) processing a reference set of depth-related log suites representative of formation characteristics at intervals along at least one borehole into clusters representative of subterranean rock classifications by steps comprising:
      (a) classifying the reference set of depth related log suites into a number $n=a \geq 2$ of disjoint clusters producing a set of n disjoint cluters of classified depth related log suites;
      (b) determining a discriminant function for classifying each depth related log suite in the reference set of depth related log suites into one of the $n=a$ disjoint clusters of classified depth related log suites;
      (c) generating a measure representative of the extent to which depth related log suites classified into $n=a$ disjoint clusters by the discriminant function corresponds to depth related log suites in the $n=a$ disjoint clusters of classified depth related log suites;
      (d) automatically iterating steps (a), (b), and (c) for different numbers $n=b, n=c, \ldots, n=i$ of disjoint clusters producing a plurality of sets having respectively $n=a, n=b, n=c, \ldots, n=i$ disjoint clusters of classified depth related log suites and producing respective discriminant functions and measures for each set of disjoint clusters; and
      (e) responsive to the measures, selecting a set of disjoint clusters having a respective discriminant function as representative of subterranean rock classifications in the reference set of depth related log suites
   (II) processing an exploration set of depth related log suites and assigning based on the selected representative set of clusters a rock classification to each depth-related log suite thereof; and
   (III) displaying the assigned rock classifications on depth-interval-by-depth-interval basis as a map of rock distributions in the subsurface.

2. The method of claim 1 wherein the reference set and the exploration set are the same set of well logs and comprising:
   evaluating probabilities that depth related log suites for each of a plurality of depths in a sequence of depths along at least one borehole in the earth contributed to selected ones of the set of disjoint clusters selected as representative of rock classifications; and
   displaying representations of thus evaluated probabilities as a function of depth-interval.

3. The method of claim 2 wherein each cluster is represented by a respective symbol and the probabilities are displayed as bar charts using such symbols.

4. The method of claim 1 further comprising:
   using the discriminant function for the reference set of disjoint clusters selected in step (e) as representative for classifying the exploration set of depth related log suites into a set of disjoint clusters having the same number of or fewer disjoint clusters n as the set of clusters selected in step (e) and producing a set of n disjoint cluster of classified depth related log suites from said exploration set;
   evaluating probabilities that depth related log suites for each of a plurality of depths in a sequence of depths in said exploration set contributed to selected ones of the disjoint clusters of said exploration set; and
   displaying representations of thus evaluated probabilities as a function of depth-interval.

5. The method of claim 1:
   wherein the reference set of depth related log suites is classified into disjoint clusters on a depth-interval-by-depth-interval basis.

6. The method of claim 1 further comprising:
   eliminating depth related log suites from a set of depth related log suites at depths corresponding to depths of depth related log suites of at least one disjoint cluster of the set of disjoint clusters selected in step (e) as representative of the reference set of depth related log suites and repeating steps (a)-(e) for the remaining set of depth related log suites;

evaluating probabilities that depth related log suites in the remaining set of depth related log suites contributed to selected ones of the disjoint clusters of the set of disjoint clusters selected by repeating steps (a)-(c) for such remaining set of depth related log suites; and displaying representations of the thus evaluated probabilities as a function of depth.

7. The method of claim 6:
wherein the set of depth related log suites from which depth related log suites are eliminated is the reference set of depth related log suites used for selecting the set of disjoint clusters representative of subterranean rock classifications.

8. The method of claim 6:
wherein the set of depth related log suites from which depth related log suites are eliminated is the exploration set of depth related log suites.

9. The method of claim 1 wherein
the clusters selected in step (e) are assigned rock classifications based on correlation with geological information;
each rock classification is assigned a respective symbol, and
rock classifications are displayed as a function of depth using such assigned symbols for the rock classifications.

10. The method of claim 1 wherein the reference set of depth related log suites comprises formation log responses representative of selected variables.

11. The method of claim 10 wherein the reference set of depth related log suites comprises formation log responses representative of at least one of lithology, porosity, facies type, permeability, and formation density.

12. The method of claim 10 wherein the reference set of depth related log suites is composited by selecting depth related log suites comprising formation log responses representative of selected rock classifications from other sets of depth related log suites, some of said other sets not containing formation log responses representative of one or more of the selected rock classifications, the resulting composite set of depth related log suites thus containing formation log responses representative of all selected rock classifications.

13. The method of claim 1 further comprising observing the statistical distribution of the reference set and transforming to a form having a normal distribution on determining that the reference set is not normally distributed.

14. The method of claim 1 further comprising compiling the exploration set of depth related log suites in a form such that each depth related log suite is associated with a rock classification assigned to a disjoint cluster selected in step (e).

15. The method of claim 1 wherein the number $n=a$ is specified and the numbers $n=b, c, \ldots, i$ are determined by adding incremental values to a.

16. The method of claim 1 wherein the measure generated in step (c) is a measure of the extent to which the discriminant function determined in step (b) reclassifies depth related log suites in the disjoint clusters produced in step (a).

17. The method of claim 16 wherein a set of disjoint clusters having a minimum number of reclassifications by a corresponding discriminant function is selected as representative of subpopulations.

18. The method of claim 1 wherein step (d) comprises iterating steps (a), (b), and (c) such that sets of disjoint clusters are produced having fewer than, more than, and a same number of disjoint clusters as a number of depth clusters expected to be represented by formation log responses in the reference set.

19. The method of claim 1 wherein step (e) comprises generating a plot of measures versus number of disjoint clusters for a plurality of sets of disjoint clusters.

20. The method of claim 1 further comprising associating with each depth related log suite symbols representative of probabilities of assigning the depth related log suite to selected ones of the disjoint clusters selected in step (e) and generating a display of such symbols.

21. The method of claim 1 wherein the rock classifications are selected from a group consisting of rock classifications based on lithology, porosity, permeability, facies, density, and oil and gas distribution.

* * * * *